United States Patent
Shiga et al.

(10) Patent No.: US 10,202,116 B2
(45) Date of Patent: Feb. 12, 2019

(54) MINING MACHINE CONTROL SYSTEM, MINING MACHINE, MINING MACHINE MANAGEMENT SYSTEM, AND MINING MACHINE MANAGEMENT METHOD

(71) Applicant: KOMATSU LTD., Tokyo (JP)

(72) Inventors: Tatsuya Shiga, Chigaski (JP); Ryuuen Kou, Hiratsuka (JP); Akiharu Nishijima, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 152 days.

(21) Appl. No.: 15/115,782

(22) PCT Filed: Nov. 27, 2015

(86) PCT No.: PCT/JP2015/083502
§ 371 (c)(1),
(2) Date: Aug. 1, 2016

(87) PCT Pub. No.: WO2016/080555
PCT Pub. Date: May 26, 2016

(65) Prior Publication Data
US 2017/0151946 A1 Jun. 1, 2017

(51) Int. Cl.
*B60W 30/14* (2006.01)
*B60W 40/076* (2012.01)
(Continued)

(52) U.S. Cl.
CPC ........ *B60W 30/143* (2013.01); *B60W 40/076* (2013.01); *B60W 40/1005* (2013.01);
(Continued)

(58) Field of Classification Search
CPC .............. B60W 40/06–40/076; B60W 30/143
See application file for complete search history.

(56) References Cited

U.S. PATENT DOCUMENTS

| 6,052,644 A | 4/2000 | Murakami et al. |
| 9,418,557 B2 | 8/2016 | Kawamata et al. |

(Continued)

FOREIGN PATENT DOCUMENTS

| JP | 08-177544 A | 7/1996 |
| JP | 2013-169956 A | 9/2013 |
| WO | 2013/125538 A1 | 8/2013 |

OTHER PUBLICATIONS

International Search Report dated Mar. 1, 2016, issued for PCT/JP2015/083502.
(Continued)

*Primary Examiner* — Genna M Mott
(74) *Attorney, Agent, or Firm* — Locke Lord LLP

(57) ABSTRACT

A control system of a mining machine controls a driving device that drives a traveling device of the mining machine. The control system includes an acceleration command value calculation unit that calculates an acceleration command value for accelerating the mining machine, a correction value calculation unit that calculates a correction value for the acceleration command value based on a first driving force component of the driving device to cause the mining machine to travel at a target traveling speed and a second driving force component of the driving device to offset a resistance component against traveling of the mining machine, an addition processing unit that calculates a correction acceleration command value by adding the acceleration command value and the correction value, and an acceleration command value output unit that outputs the correction acceleration command value to the driving device.

7 Claims, 8 Drawing Sheets

(51) Int. Cl.
*B60W 40/13* (2012.01)
*E21F 13/00* (2006.01)
*B60W 40/10* (2012.01)
*E21C 41/26* (2006.01)

(52) U.S. Cl.
CPC .......... *B60W 40/13* (2013.01); *E21C 41/31* (2013.01); *E21F 13/00* (2013.01); *B60W 2300/17* (2013.01); *B60W 2520/10* (2013.01); *B60W 2520/105* (2013.01); *B60W 2530/10* (2013.01); *B60W 2530/16* (2013.01); *B60W 2550/142* (2013.01); *B60W 2720/10* (2013.01); *B60W 2720/106* (2013.01)

(56) References Cited

U.S. PATENT DOCUMENTS

| | | | |
|---|---|---|---|
| 2006/0089234 A1* | 4/2006 | Ogawa ............ | B60W 30/18054 477/107 |
| 2016/0019792 A1* | 1/2016 | Kawamata .......... | B60R 16/0236 701/70 |
| 2016/0159352 A1* | 6/2016 | Kim .................... | B60W 30/143 701/94 |
| 2017/0015321 A1* | 1/2017 | Nakadori .............. | B60W 30/16 |

OTHER PUBLICATIONS

Office Action dated Sep. 1, 2016, issued for the Australian patent application No. 2015350919.
Office Action dated Jun. 11, 2018, issued for the corresponding Canadian patent application No. 2946272.

* cited by examiner

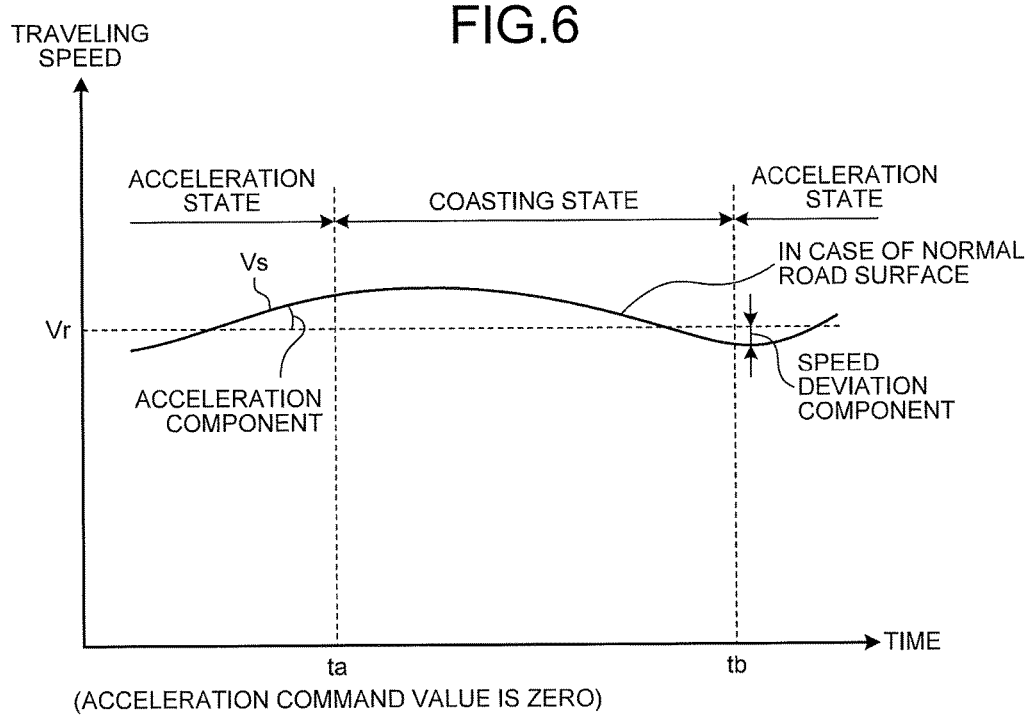
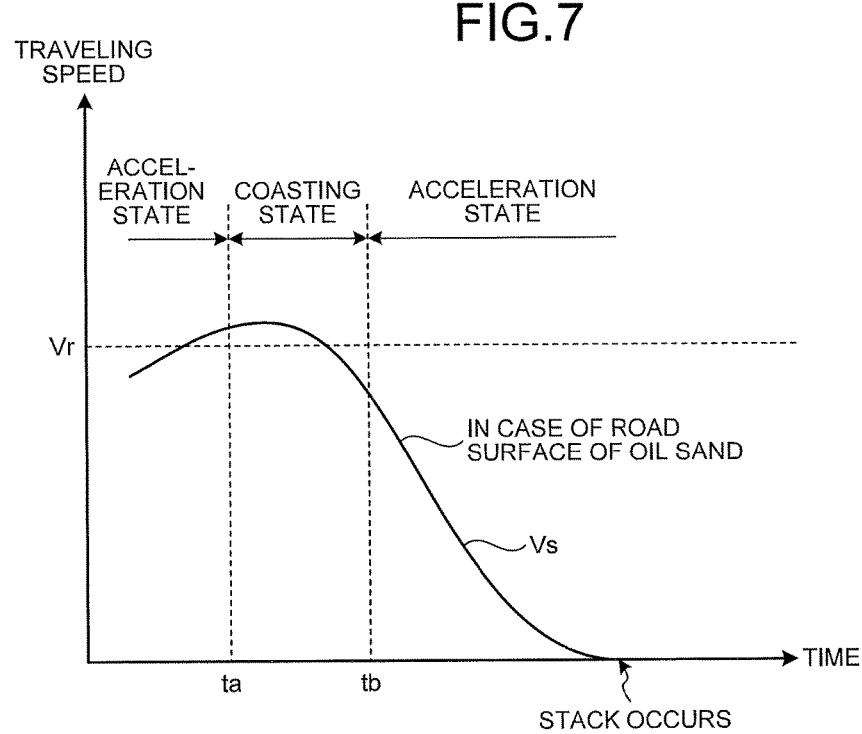

MINING MACHINE CONTROL SYSTEM, MINING MACHINE, MINING MACHINE MANAGEMENT SYSTEM, AND MINING MACHINE MANAGEMENT METHOD

FIELD

The present invention relates to a mining machine control system, a mining machine, a mining machine management system, and a mining machine management method.

BACKGROUND

A mining machine may be controlled to travel a mine according to a set target traveling speed. Patent Literature 1 discloses a technique that estimates transition of vehicle speed based on traveling route information including a road surface resistance in the traveling route and determines which one of acceleration traveling, deceleration traveling, and coasting traveling should be performed, so that the vehicle speed after a predetermined time elapses is within a predetermined range.

CITATION LIST

Patent Literature

Patent Literature 1: Japanese Patent Application Laid-open No. 2013-169956

SUMMARY

Technical Problem

A mining machine may travel a mine called an oil sand mine. The oil sand is sandstone containing high viscosity mineral oil. On a road surface of oil sand, the road surface is in a sponge like state and the mining machine gradually sinks due to its own weight. Therefore, the road surface resistance is very large when the mining machine travels and, further, the road surface is very rugged. Therefore, even if a target traveling speed is set for the mining machine, when the mining machine travels on the road surface of oil sand, it may be difficult for the mining machine to travel according to the target traveling speed. For example, there is a possibility that an actual traveling speed of the mining machine becomes significantly lower than the target traveling speed due to the large road surface resistance and/or the mining machine stacks (stops) on the road surface of oil sand due to unevenness of the road surface and the like. Once the mining machine stacks on the road surface of oil sand, a lot of time is required for the mining machine to escape from the state and return to a normal traveling state, which could result in lowered productivity in the mine.

An object of an aspect of the present invention is to provide a mining machine control system, a mining machine, a mining machine management system, and a mining machine management method, which can suppress lowering of the productivity in a mine by suppressing an error between an actual traveling speed of the mining machine and a target traveling speed.

Solution to Problem

According to a first aspect of the present invention, a mining machine control system that controls a driving device configured to drive a traveling device of a mining machine, the mining machine control system comprises: an acceleration command value calculation unit that calculates an acceleration command value for accelerating the mining machine; a correction value calculation unit that calculates a correction value for the acceleration command value, based on a first driving force component of the driving device to cause the mining machine to travel at a target traveling speed and on a second driving force component of the driving device to offset a resistance component against traveling of the mining machine; an addition processing unit that calculates a correction acceleration command value by adding the acceleration command value and the correction value; and an acceleration command value output unit that outputs the correction acceleration command value to the driving device.

According to a second aspect of the present invention, a mining machine comprises the mining machine control system according to the first aspect.

According to a third aspect of the present invention, a mining machine management system comprises a management device that outputs traveling condition data including the target traveling speed and a target traveling route to the mining machine according to the second aspect.

According to a fourth aspect of the present invention, a mining machine management method comprises: transmitting traveling condition data including a target traveling speed and a target traveling route in a mine to a mining machine including a traveling device driven by a driving force of a driving device; calculating an acceleration command value for accelerating the mining machine; calculating a first driving force component of the driving device to cause the mining machine to travel at the target traveling speed; calculating a second driving force component of the driving device to offset a resistance component against traveling of the mining machine; calculating a correction value for the acceleration command value based on the first driving force component and the second driving force component; calculating a correction acceleration command value by adding the acceleration command value and the correction value; and outputting the correction acceleration command value to the driving device.

Advantageous Effects of Invention

According to an aspect of the present invention, a mining machine control system, a mining machine, a mining machine management system, and a mining machine management method are provided, which can suppress lowering of the productivity in a mine by suppressing an error between an actual traveling speed of the mining machine and a target traveling speed.

BRIEF DESCRIPTION OF DRAWINGS

FIG. 6 is a diagram for explaining a traveling control of the dump truck.

FIG. 7 is a diagram for explaining a traveling control of the dump truck.

DESCRIPTION OF EMBODIMENT

Hereinafter, an embodiment of the present invention will be described with reference to the drawings. However, the present invention is not limited to the embodiment.

<Overview of Mining Machine Management System>

Figure 1:
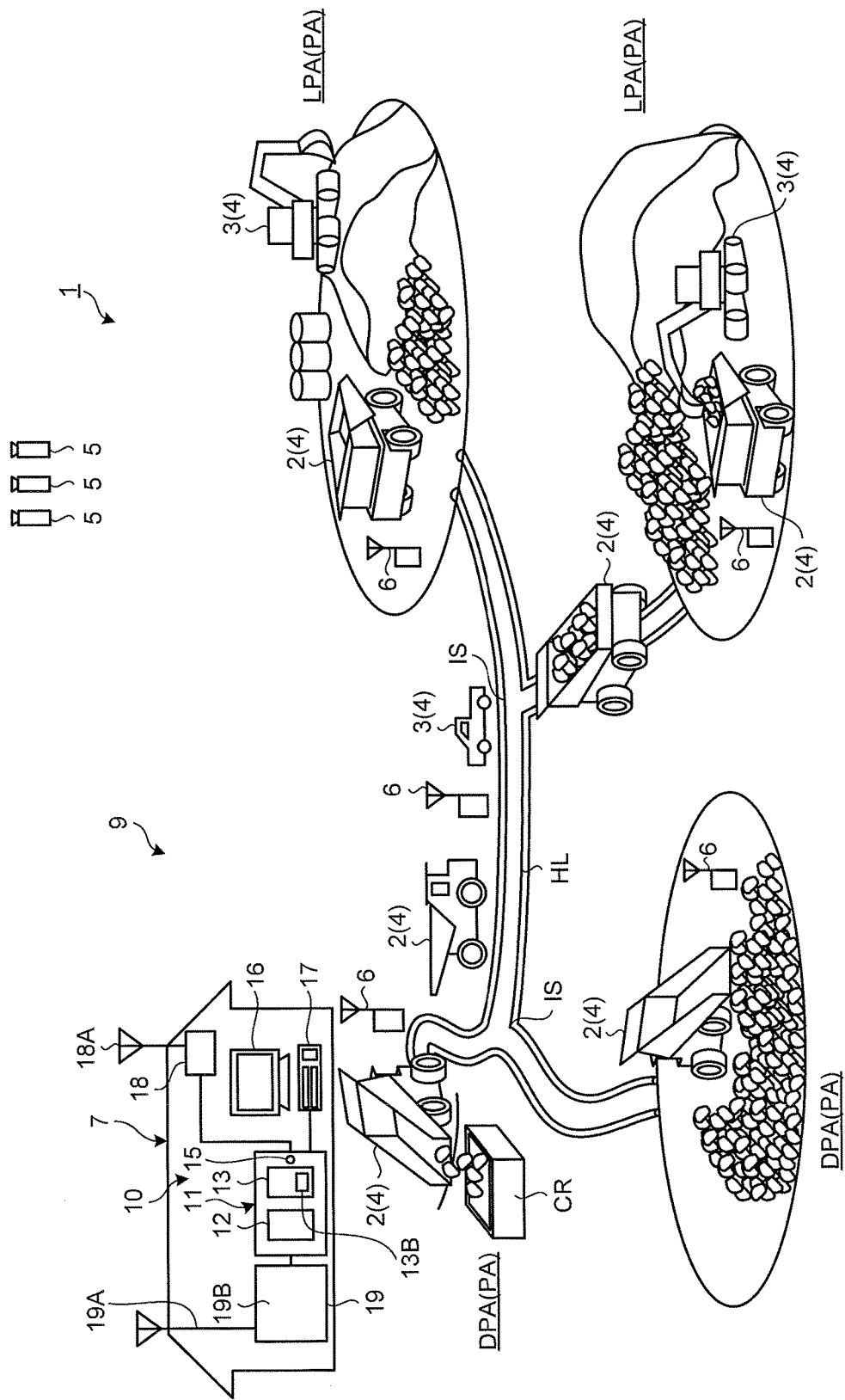
FIG. 1 is a diagram schematically illustrating an example of a mining machine management system according to an embodiment of the present invention.

FIG. 1 is a diagram illustrating an example of a management system 1 of a mining machine 4 according to an embodiment of the invention. The management system 1 manages the mining machine 4. The management of the mining machine 4 includes at least one of operation management of the mining machine 4, evaluation of productivity of the mining machine 4, evaluation of operation technique of an operator of the mining machine 4, maintenance of the mining machine 4, and abnormality diagnosis of the mining machine 4.

The mining machine 4 is a generic name of machines used for various operations in a mine. The mining machine 4 includes at least one of a boring machine, an excavating machine, a loading machine, a transporting machine, a crushing machine, and a vehicle driven by a driver. The excavating machine is a mining machine for excavating a mine. The excavating machine is a mining machine for excavating a mine. The loading machine includes at least one of a hydraulic shovel, an electric shovel, and a wheel loader. The transporting machine is a mining machine for transporting a load. The crushing machine is a mining machine for crushing discharged earth that is put in from the transporting machine. The mining machine 4 can move in a mine.

In the embodiment, the mining machine 4 includes a dump truck 2 which is a transporting machine that can travel in a mine and another mining machine 3 that is different from the dump truck 2. In the embodiment, an example will be described, in which the dump truck 2 is mainly managed by the management system 1.

As illustrated in FIG. 1, the dump truck 2 travels at least a part of a work area PA of the mine and a conveying path HL connected to the work area PA. The dump truck 2 travels along a target traveling route that is set in the conveying path HL and the work area PA.

The work area PA includes at least one of a loading site LPA and an earth discharging site DPA. The loading site LPA is an area where a loading work for loading a load on the dump truck 2 is performed. The earth discharging site DPA is an area where a discharging work for discharging a load from the dump truck 2 is performed. In the example illustrated in FIG. 1, a crushing machine CR is provided in at least a part of the earth discharging site DPA.

The embodiment is described on the assumption that the dump truck 2 is an unmanned dump truck which autonomously travels the mine based on a command signal from a management device 10. The autonomous traveling of the dump truck 2 means that the dump truck 2 travels based on the command signal from the management device 10 without depending on an operation of a driver. However, the technical content of the embodiment may be applied to a manned dump truck that is driven by an operation of an operator.

In FIG. 1, the management system 1 includes the management device 10 arranged in a control facility 7 installed in the mine and a communication system 9. The communication system 9 includes a plurality of repeaters 6 that relay data or a command signal. The communication system 9 wirelessly communicates data or a command signal between the management device 10 and the mining machine 4. Further, the communication system 9 wirelessly communicates data or a command signal between a plurality of mining machines 4.

In the embodiment, the position of the dump truck 2 and the position of the other mining machine 3 are detected by using GNSS (Global Navigation Satellite System). The GNSS stands for Global Navigation Satellite System. An example of the Global Navigation Satellite System is GPS (Global Positioning System). The GNSS includes a plurality of positioning satellites 5. The GNSS detects a position defined by coordinate data of latitude, longitude, and altitude. The position detected by the GNSS is an absolute position defined in a global coordinate system. The position of the dump truck 2 and the position of the other mining machine 3 in the mine are detected by the GNSS.

In the description below, the position detected by the GNSS is referred to as a GPS position as needed. The GPS position is an absolute position and includes coordinate data of latitude, longitude, and altitude. The absolute position includes an estimated position of the dump truck 2, which is estimated with a high degree of accuracy.

<Management Device>

Next, the management device 10 will be described. The management device 10 transmits data or a command signal to the mining machine 4 and receives data from the mining machine 4. As illustrated in FIG. 1, the management device 10 includes a computer 11, a display device 16, an input device 17, and a wireless communication device 18.

The computer 11 includes a processing device 12, a storage device 13, and an input/output unit 15. The display device 16, the input device 17, and the wireless communication device 18 are connected to the computer 11 through the input/output unit 15.

The processing device 12 performs calculation processing to manage the mining machine 4. The storage device 13 is connected to the processing device 12 and stores data to manage the mining machine 4. The input device 17 is a device to input data to manage the mining machine 4 into the processing device 12. The processing device 12 performs calculation processing by using data stored in the storage device 13, data input from the input device 17, and data acquired through the communication system 9. The display device 16 displays a calculation processing result of the processing device 12 and the like.

The wireless communication device 18 is arranged in the control facility 7, includes an antenna 18A, and is connected to the processing device 12 through the input/output unit 15. The communication system 9 includes the wireless communication device 18. The wireless communication device 18 can receive data transmitted from the mining machine 4. The received data is output to the processing device 12 and stored in the storage device 13. The wireless communication device 18 can transmit data to the mining machine 4.

Figure 2:
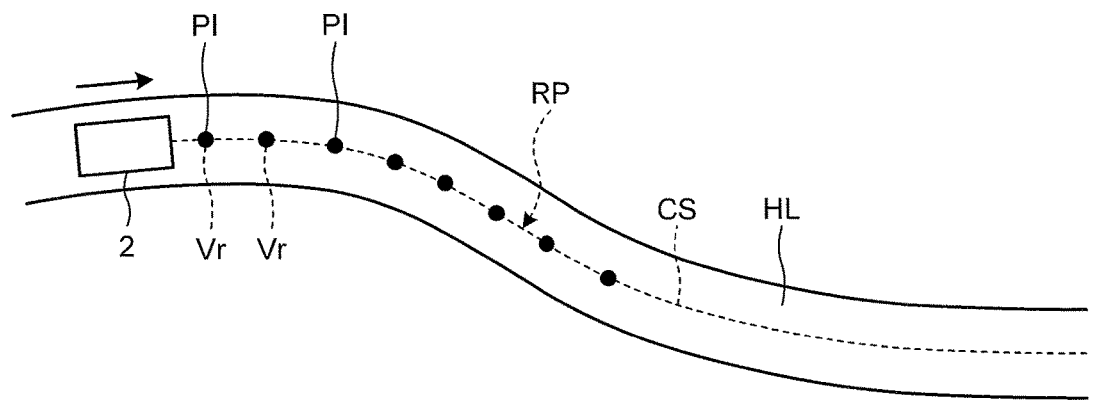
FIG. 2 is a schematic diagram for explaining a target traveling route of a dump truck according to the embodiment.

FIG. 2 is a schematic diagram illustrating the dump truck 2 traveling on the conveying path HL. The processing device 12 of the management device 10 functions as a traveling condition data generation unit that generates traveling condition data including a target traveling speed Vr and a target traveling route RP of the dump truck 2 that travels a mine. The target traveling route RP is defined by course data CS. The course data CS is an aggregate of a plurality of points PI in each of which an absolute address (coordinates) is defined. A locus that passes through a plurality of points PI is the target traveling route RP. The processing device 12 sets the target traveling speed Vr of the dump truck 2 for each of the plurality of points PI. The management device 10 outputs the traveling condition data including the target traveling route RP including the plurality of points PI and the target traveling speed Vr at each point PI, to the dump truck 2 through the communication system 9. The dump truck 2 travels the mine according to the traveling condition data transmitted from the management device 10.

<Dump Truck>

Figure 3:
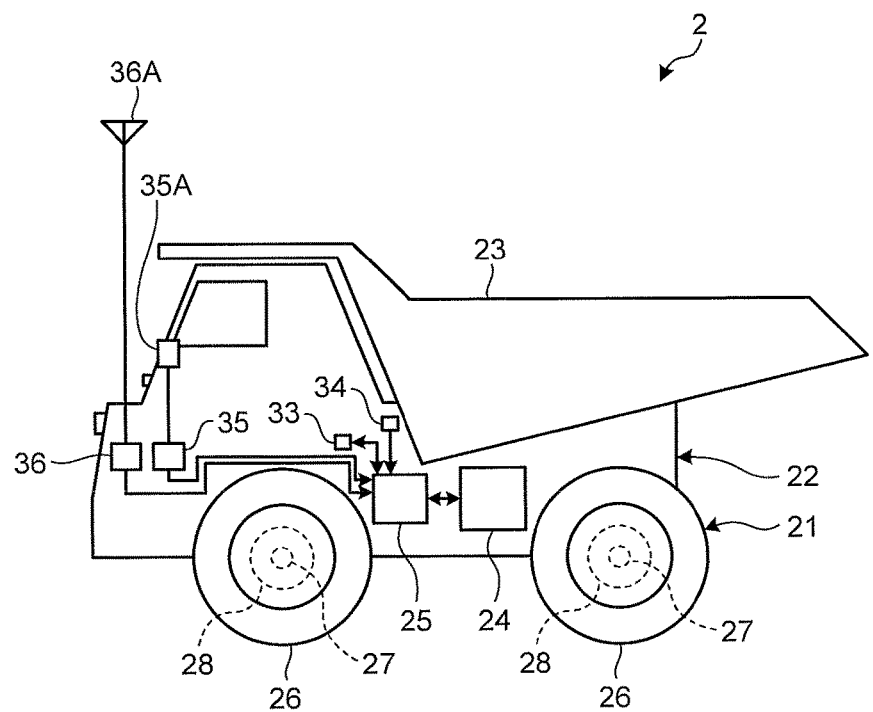
FIG. 3 is a diagram schematically illustrating an example of the dump truck according to the embodiment.
Figure 4:
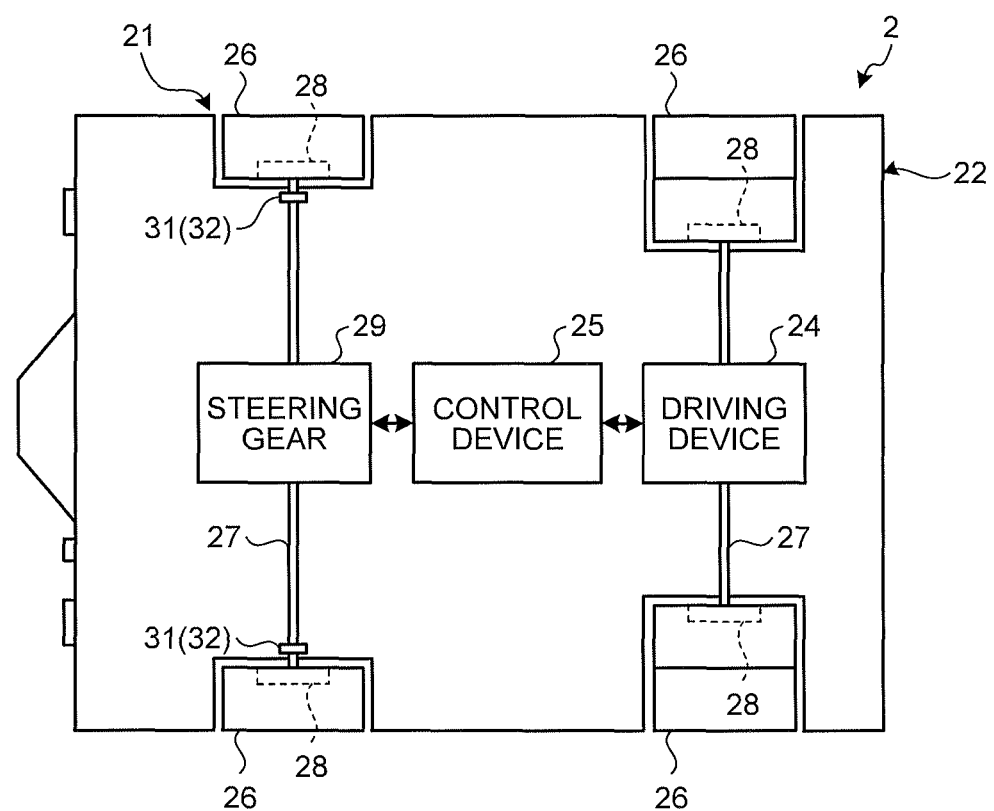
FIG. 4 is a diagram schematically illustrating an example of the dump truck according to the embodiment.

Next, the dump truck 2 will be described. FIGS. 3 and 4 are diagrams schematically illustrating an example of the dump truck 2 according to the embodiment.

The dump truck 2 includes a traveling device 21 that can travel the mine, a vehicle main body 22 that is supported by the traveling device 21, a vessel 23 that is supported by the vehicle main body 22, a driving device 24 that drives the traveling device 21, and a control device 25.

The traveling device 21 includes vehicle wheels 26, axles 27 that rotatably support the vehicle wheels 26, a brake device 28 that puts a brake on the traveling device 21, and a steering gear 29 that can adjust a traveling direction.

The traveling device 21 is driven by a driving force generated by the driving device 24. The driving device 24 generates a driving force to accelerate the dump truck 2. The driving device 24 drives the traveling device 21 by an electric drive method. The driving device 24 includes an internal combustion engine such as a diesel engine, a power generator driven by motive power of the internal combustion engine, and an electric motor driven by power generated by the power generator. A driving force generated by the electric motor is transmitted to the vehicle wheels 26 of the traveling device 21. Thereby, the traveling device 21 is driven. The dump truck 2 self-travels by the driving force of the driving device 24 provided in the vehicle main body 22. The output of the driving device 24 is adjusted, so that the traveling speed of the dump truck 2 is adjusted. The driving device 24 may drive the traveling device 21 by a mechanical drive method. For example, motive power generated by the internal combustion engine may be transmitted to the vehicle wheels 26 of the traveling device 21 through a motive power transmission device.

The steering gear 29 can adjust the traveling direction of the traveling device 21. The traveling direction of the dump truck 2 including the traveling device 21 includes an orientation of a front section of the vehicle main body 22. The steering gear 29 adjusts the traveling direction of the dump truck 2 by changing the orientation of the vehicle wheels 26.

The brake device 28 generates a braking force to decelerate or stop the dump truck 2. The control device 25 outputs an acceleration command signal to operate the driving device 24, a brake command signal to operate the brake device 28, and a steering command signal to operate the steering gear 29. The driving device 24 generates a driving force to accelerate the dump truck 2 based on the acceleration command signal output from the control device 25. The brake device 28 generates a braking force to decelerate the dump truck 2 based on the brake command signal output from the control device 25. The steering gear 28 generates a force to change the orientation of the vehicle wheels 26 to cause the dump truck 2 to travel straight ahead or swing based on the steering command signal output from the control device 25.

In the description below, a state in which the acceleration command signal is output from the control device 25, the driving device 24 generates the driving force, and the dump truck 2 accelerates is referred to as an acceleration state, as needed, and a state in which the dump truck 2 travels at a constant speed by the driving force generated by the driving device 24 is referred to as a constant speed state, as needed. Further, in the description below, a state in which the brake command signal is output from the control device 25, the brake device 28 generates the braking force, and the dump truck 2 decelerates is referred to as an deceleration state, as needed. Further, in the description below, a state in which the dump truck 2 travels in a state in which output of both the acceleration command signal and the brake command signal from the control device 25 is stopped, the driving device 24 does not generate the driving force, and the brake device 28 does not generate the braking force is referred to as a coasting state, as needed.

The dump truck 2 further includes a traveling speed detector 31 that detects a traveling speed Vs of the dump truck 2, an acceleration detector 32 that detects an acceleration As of the dump truck 2, an inclined angle detector 33 that detects an inclined angle θ of the dump truck 2 with respect to the horizontal plane, and a load amount detector 34 that detects a load amount of a load loaded on the vessel 23.

The dump truck 2 further includes a position detector 35 that detects a position of the dump truck 2 and a wireless communication device 36.

The traveling speed detector 31 detects the traveling speed Vs of the dump truck 2. The traveling speed detector 31 includes a rotation speed sensor that detects a rotation speed of the vehicle wheels 26. As the rotation speed of the vehicle wheels 26 correlates with the traveling speed Vs of the dump truck 2, a rotation speed value, that is a value detected by the rotation speed sensor, is converted into a traveling speed value of the dump truck 2. The traveling speed detector 31 may detect a rotation speed of the axles 26.

The acceleration detector 32 detects the acceleration As of the dump truck 2. The acceleration As of the dump truck 2 includes a positive acceleration and a negative acceleration (deceleration). In the embodiment, the calculation processing is performed based on the rotation speed value that is a value detected by the rotation speed sensor for detecting the rotation speed of the vehicle wheels 26. Thereby, the rotation speed value is converted into an acceleration value of the dump truck 2. Specifically, the acceleration detector 32 derives the acceleration As of the dump truck 2 based on a difference between the traveling speeds Vs in a predetermined period of time. For example, the acceleration As is derived from a difference between the traveling speeds Vs in 0.5 [sec]. The traveling speed detector 31 and the acceleration detector 32 may be detectors different from each other.

The inclined angle detector 33 detects the inclined angle θ of the dump truck 2 with respect to the horizontal plane. The inclined angle θ of the dump truck 2 includes an inclined angle of a contact area of the vehicle wheels 26 (tires). The inclined angle detector 33 includes an inertial measurement unit (IMU). The inclined angle detector 33 detects the inclined angle θ of the dump truck 2 and detects the gradient of an upward slope or a downward slope on which the dump truck 2 travels.

The load amount detector 34 detects a load amount of a load loaded on the vessel 23. The weight of the dump truck 2 in an empty load state in which no load is loaded on the vessel 23 is known data. The load amount detector 34 detects the load amount of the load loaded on the vessel 23 and detects a total weight M of the dump truck 2 based on the detected value of the load amount and the weight of the dump truck 2 in the empty load state which is the known data.

The position detector 35 includes a GPS receiver and detects the GPS position (coordinates) of the dump truck 2. The position detector 35 includes an antenna 35A for the GPS. The antenna 35A receives a radio wave from the GPS satellite 5. The position detector 35 calculates the position of the antenna 35A by converting a signal based on the radio wave from the GPS satellite 5 received by the antenna 35A into an electrical signal. When the GPS position of the antenna 35A is detected, the GPS position of the dump truck 2 is detected.

The communication system 9 includes the wireless communication device 36 provided in the dump truck 2. The wireless communication device 36 includes an antenna 36A. The wireless communication device 36 can communicate with the management device 10.

The management device 10 transmits a command signal including the traveling condition data of the dump truck 2 to the control device 25 through the communication system 9. The control device 25 controls at least one of the driving device 24, the brake device 28, and the steering gear 29 of the dump truck 2 based on the traveling condition data provided from the management device 10, so that the dump truck 2 travels according to the traveling condition data (including the target traveling route RP having a plurality of points PI, and the target traveling speed Vr at each point PI).

<Control System>

Figure 5:
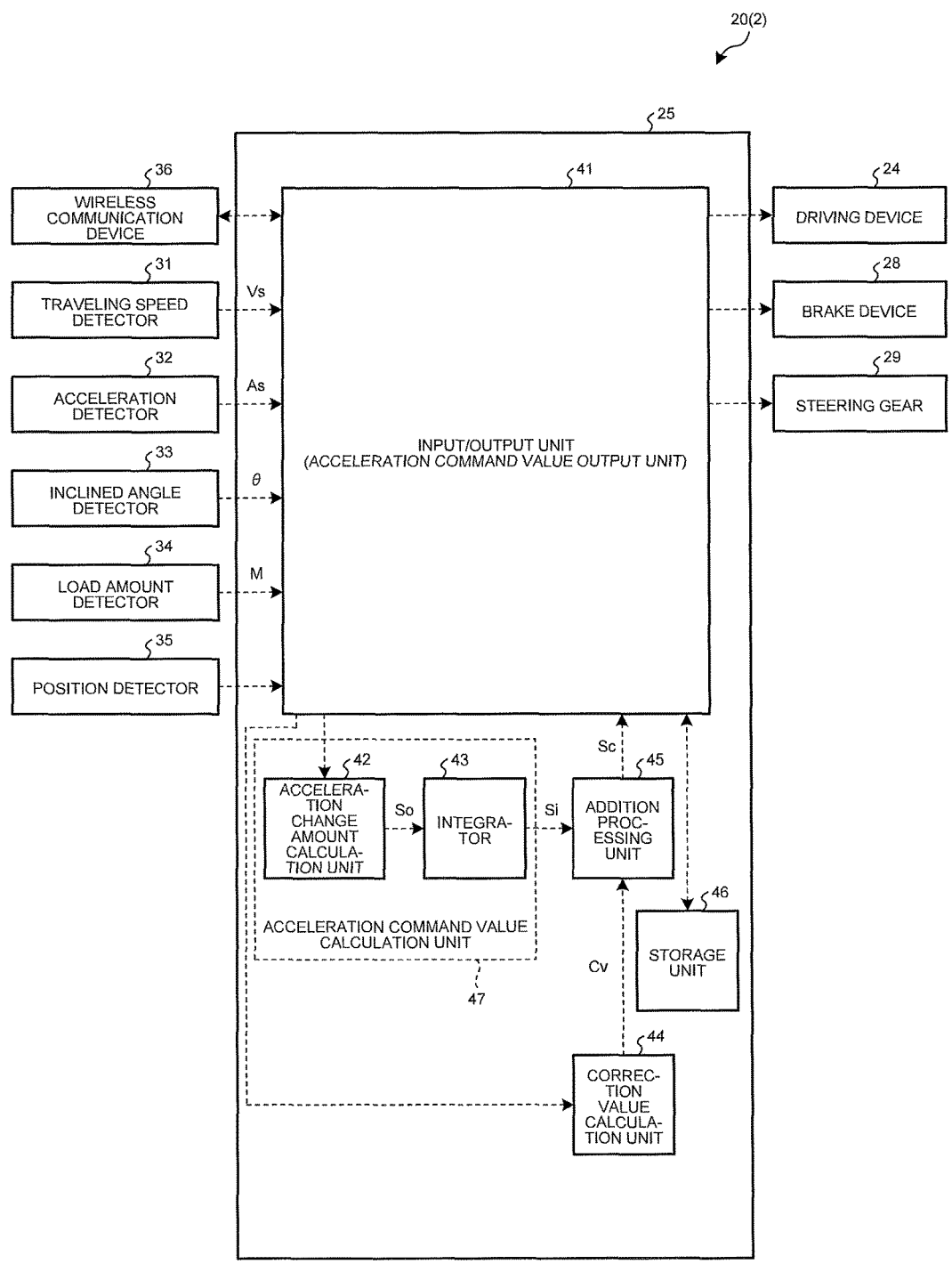
FIG. 5 is a block diagram illustrating an example of a control system of the dump truck according to the embodiment.

Next, a control system 20 of the dump truck 2 according to the embodiment will be described. FIG. 5 is a control block diagram of the control system 20 according to the embodiment. The control system 20 is mounted in the dump truck 2.

As illustrated in FIG. 5, the control system 20 includes the wireless communication device 36, the traveling speed detector 31, the acceleration detector 32, the inclined angle detector 33, the load amount detector 34, the position detector 35, the control device 25, the driving device 24, the brake device 28, the steering gear 29.

The control device 25 includes an input/output unit 41, an acceleration command value calculation unit 47 including an acceleration change amount calculation unit 42 and an integrator 43, a correction value calculation unit 44, an addition processing unit 45, and a storage unit 46. Although the control device 25 includes a brake command value calculation unit that actuates the brake device 28 and a steering command value calculation unit that operates the steering gear 29, these units will not be described in the embodiment, and description related to an acceleration command value to actuate the driving device 24 will be mainly given.

The input/output unit 41 acquires command data including the traveling condition data from the management device 10 which is output from the wireless communication device 36, traveling speed data indicating the traveling speed Vs of the dump truck 2 which is output from the traveling speed detector 31, acceleration data indicating the acceleration As of the dump truck 2 which is output from the acceleration detector 32, inclined angle data indicating the inclined angle θ of the dump truck 2 which is output from the inclined angle detector 33, load amount data indicating a load amount M of the dump truck 2 which is output from the load amount detector 34, and position data indicating the position of the dump truck 2 which is output from the position detector 35. Further, the input/output unit 41 outputs the acceleration command signal to the driving device 24, outputs the brake command signal to the brake device 28, and outputs the steering command signal to the steering gear 29.

The acceleration change amount calculation unit 42 calculates an acceleration change amount So to accelerate and decelerate the dump truck 2. The acceleration change amount calculation unit 42 calculates the acceleration change amount So that is an acceleration amount to be changed with respect to the current acceleration command value, based on at least the traveling speed data and the acceleration data of the dump truck 2, so that the dump truck 2 travels at the target traveling speed Vr. For example, when the acceleration change amounts so is calculated, map data of two variables, which are a speed deviation between the actual traveling speed Vs and the target traveling speed Vr of the dump truck 2 at the present time point and the acceleration of the dump truck 2 at the present time point, may be prepared in advance; and the acceleration change amount So may be determined based on the map data. In the embodiment, the acceleration change amount calculation unit 42 may calculate the acceleration change amount So by using the inclined angle data in addition to the traveling speed data and the acceleration data of the dump truck 2. The acceleration change amount calculation unit 42 calculates the acceleration change amount So at a predetermined time period T.

The integrator 43 integrates the acceleration change amount So calculated by the acceleration change amount calculation unit 42 and outputs the integrated acceleration change amount So as an acceleration command value Si. The integration performed by the integrator 43 is the same as that performed by an ordinary integrator, and variation of the acceleration command value is alleviated by causing the acceleration command value to pass through the integrator 43. In the embodiment, the integrator 43 outputs an integrated acceleration command value Si by adding the acceleration change amount So acquired from the acceleration change amount calculation unit 42 at the present time point to the acceleration command value Si integrated by the integrator 43 at a time point prior to the present time point by the time period T. In other words, the acceleration command value calculation unit 47 outputs the acceleration command value Si by using the acceleration change amount So calculated by the acceleration change amount calculation unit 42 and the integrator 43.

The correction value calculation unit 44 calculates a correction value Cv for the acceleration command value Si based on a first driving force component of the driving device 24 to cause the dump truck 2 to travel at the target traveling speed Vr and a second driving force component of the driving device 24 to offset a resistance component against traveling of the dump truck 2.

The first driving force component is a driving force of the driving device 24 at the present time point to cause the dump truck 2 to travel at the target traveling speed Vr at a future time point (for example, a time point one second after the present time point). The first driving force component is calculated based on a speed deviation component Dv between the actual traveling speed Vs of the dump truck 2 at the present time point and the target traveling speed Vr of the dump truck 2 at a future time point and the total weight M of the dump truck 2. The correction value calculation unit 44 can calculate the first driving force component based on the actual traveling speed Vs of the dump truck 2 at the present time point acquired from a detection result of the traveling speed detector 31, the target traveling speed Vr of the dump truck 2 at a future time point transmitted from the management device 10, and the total weight M of the dump truck 2.

The second driving force component is a driving force of the driving device 24 necessary to offset a negative driving force component applied to the dump truck 2 at the present time point. A deceleration of the dump truck 2 at the present time point (considered only during deceleration), a deceleration generated by an inclination, the weight of the dump truck 2, and the like are examples of the negative driving force component. When the dump truck 2 at the present time point is decelerating and when the dump truck 2 travels on an upward slope, a negative driving force component occurs. When a load is loaded on the vessel 23 and the total weight M of the dump truck 2 increases, a negative driving force component due to the deceleration of the dump truck 2 at the present time point or the deceleration generated by an inclination also increases. The correction value calculation unit 44 can calculate the second driving force component based on a deceleration As of the dump truck 2 at the present time point which is derived from a detection result of the acceleration detector 32, the inclined angle θ of the dump truck 2 at the present time point which is derived from a detection result of the inclined angle detector 33, and the total weight M of the dump truck 2 at the present time point which is derived from a detection result of the load amount detector 34.

The correction value calculation unit 44 calculates a driving force Freq of the driving device 24 which is required at the present time point to cause the dump truck 2 to travel at the target traveling speed Vr based on the speed deviation component Dv derived from a detection result of the traveling speed detector 31, a acceleration component Da formed from the deceleration As of the dump truck 2 at the present time point which is derived from a detection result of the acceleration detector 32, an inclination component Ds including the inclined angle θ of the dump truck 2 at the present time point which is derived from the inclined angle θ which is a detection result of the inclined angle detector 33, and the total weight M of the dump truck 2 at the present time point which is derived from a detection result of the load amount detector 34.

When the speed deviation component is Dv, the acceleration component is Da, the inclination component is Ds, the total weight of the dump truck 2 is M, and adjustment gains are K1, K2, and K3, the correction value calculation unit 44 calculates the driving force Freq of the driving device 24, which is required at the present time point to cause the dump truck 2 to travel at the target traveling speed Vr, by performing calculation processing of equation (1) described below. The inclination component Ds is a value derived from the inclined angle θ and a gravitational acceleration g, and Ds=g×sinθ.

$$Freq=(K1 \times Dv + K2 \times Da + K3 \times Ds) \times M \quad (1)$$

The correction value calculation unit 44 calculates the correction value Cv for the acceleration command value based on a first driving force component derived from the speed deviation component Dv and the total weight M of the dump truck 2, and a second driving force component derived from the acceleration component Da, the inclination component Ds, and total weight M.

As described above, in the embodiment, the driving device 24 includes the electric motor. Maximum driving force Fmax of the electric motor corresponding to engine speed per unit time of the electric motor is known data and is stored in the storage unit 46. In the embodiment, table data representing a relationship between the engine speed and the maximum driving force Fmax is stored in the storage unit 46. When the correction value is Cv, the driving force required at the present time point is Freq, and the maximum driving force is Fmax, the correction value calculation unit 44 calculates the correction value Cv by performing calculation processing of the following equation (2).

$$Cv=100 \times (Freq/Fmax) \quad (2)$$

The correction value Cv is a ratio [%] of the driving force Freq to the maximum driving force Fmax. When the correction value Cv is too large, the dump truck 2 is suddenly accelerated. To prevent such acceleration, in the embodiment, an upper limit value of the correction value Cv may be determined and, for example, the correction value Cv may be set so as to be smaller than or equal to 45 [%] of the maximum driving force Fmax.

The addition processing unit 45 calculates a correction acceleration command value Sc by adding the acceleration command value Si calculated by the acceleration command value calculation unit 47 and the correction value Cv calculated by the correction value calculation unit 44.

The input/output unit 41 outputs the correction acceleration command value Sc calculated by the addition processing unit 45 to the driving device 24. The input/output unit 41 functions as an acceleration command value output unit which outputs the correction acceleration command value Sc to the driving device 24. The driving device 24 generates a driving force according to the correction acceleration command value Sc output from the acceleration command value output unit 21.

<Traveling Control>

Next, an example of a traveling control of the dump truck 2 according to the embodiment will be described. FIG. 6 is a schematic diagram for explaining the traveling control of the dump truck 2. In FIG. 6, the horizontal axis represents time and the vertical axis represents the traveling speed of the dump truck 2.

The traveling condition data including the target traveling speed Vr is transmitted from the management device 10 to the dump truck 2. The control device 25 of the dump truck 2 controls the driving device 24 of the dump truck 2 so that the dump truck 2 travels according to the target traveling speed Vr.

As described above, for example, the control device 25 can cause an acceleration state by determining the acceleration change amount So based on a map data including a speed deviation between the actual traveling speed Vs which is a detection result of the traveling speed detector 31 and the target traveling speed Vr and the acceleration As of the dump truck 2 at the present time point which is a detection result of the acceleration detector 32 and finally outputting an acceleration command value. Here, the acceleration state defines a state in which the acceleration command value to drive the driving device 24 is a positive value (a value greater than zero). For example, a state in which the acceleration command value is changed to a value smaller than that at the present time point, that is, a state in which an accelerator is weakened and the dump truck 2 is decelerated, is also included in the acceleration state. The control device 25 calculates the acceleration command value based on the map data by using the speed deviation and the acceleration, and as a result, the control device 25 may set the acceleration command value to zero, that is, a coasting state. As described above, the acceleration command value calculation unit 47 uses the integrator 43, so that the acceleration command value does not become zero all of a sudden, but gradually reduces and becomes zero eventually. As a condition to switch to the coasting state, it is set so as not to switch to the coasting state immediately even when the actual traveling speed Vs slightly exceeds the target traveling speed Vr. However, it may be set so as to switch to the coasting state when, for example, the actual traveling speed Vs largely exceeds the target traveling speed Vr or the actual traveling speed Vs slightly exceeds the target traveling speed Vr in a state in which the inclined angle θ that is a detection result of the inclined angle detector 33 indicates negative value (downward gradient). The control device 25 causes the dump truck 2 to travel by controlling the driving device 24 so that the dump truck 2 basically travels in the acceleration state without largely departing from the target traveling speed Vr while the acceleration state is occasionally switched to the coasting state.

The example of FIG. 6 illustrates a transition of the traveling speed when the dump truck 2 travels on a normal road surface, that is, a road surface, the state of which is dry, solid, and not so uneven. When the acceleration command signal is output and the dump truck 2 is in the acceleration state, the traveling speed Vs of the dump truck 2 gradually increases. The control device 25 gradually decreases the acceleration command value from when the traveling speed Vs slightly exceeds the target traveling speed Vr, and the control device 25 sets the acceleration command value to zero at a time point ta at which the traveling speed Vs exceeds the target traveling speed Vr by a predetermined amount. In a state in which the acceleration command value is zero, the traveling state of the dump truck 2 is the coasting state. When the dump truck 2 is in the coasting state, the traveling speed Vs of the dump truck 2 gradually decreases due to a resistance component against traveling applied to the dump truck 2 including a road surface resistance. At a time point tb at which the traveling speed Vs of the dump truck 2 decreases to be lower than the target traveling speed Vr by a predetermined amount, the control device 25 sets the acceleration command value to a positive value again. Thereby, the state of the dump truck 2 is switched to the acceleration state again, and the traveling speed Vs increases and comes close to the target traveling speed Vr.

When the road surface is in a dry state (a normal road surface), as illustrated in FIG. 6, the traveling state changes from the acceleration state to the coasting state, and then the traveling speed Vs gradually decreases.

On the other hand, when the road surface is a that of an oil sand mine, the road surface is in a sponge like state as described above, and the road surface resistance is very large. Thereby, as illustrated in FIG. 7, the traveling state changes from the acceleration state to the coasting state, and then the traveling speed Vs suddenly decreases. In this case, even when a positive acceleration command value begins to be output to the driving device 24 from the time point tb, it is not possible to rapidly increase the acceleration command value due to effect of the integrator 43. Accordingly, the driving force is insufficient, and the actual target speed Vs is significantly lower than the target traveling speed Vr. Further, in the worst case, as illustrated in FIG. 7, the traveling of the dump truck 2 may stack (stop).

Therefore, in the embodiment, the control device 25 is provided with the addition processing unit 45, assuming that the dump truck 2 travels on a road surface of a mine where the road surface resistance is very large, such as a road surface of an oil sand mine. As described above, the addition processing unit 45 calculates the correction acceleration command value Sc by adding the acceleration command value Si output by the acceleration command value calculation unit 47 and the correction value Cv. The correction acceleration command value Sc is output to the driving device 24.

Figure 8:
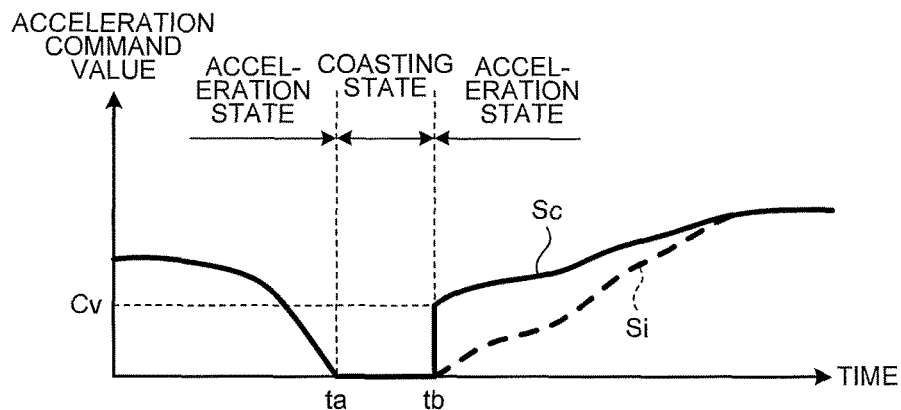
FIG. 8 is a diagram illustrating an example of an acceleration command value output from an acceleration command value output unit according to the embodiment.

FIG. 8 is a diagram illustrating an example of the acceleration command value Sc output from the acceleration command value output unit 41 according to the embodiment. In FIG. 8, the horizontal axis represents time and the vertical axis represents the acceleration command value.

In the embodiment, for example, as illustrated in FIG. 8, a configuration may be adopted, where the correction value Cv is added only when the acceleration command value switches from zero to a positive value at the time point tb later than the time point ta, after the acceleration command value becomes zero at the time point ta. As described above, the correction value calculation unit 44 that calculates the correction value Cv calculates the correction value Cv based on the speed deviation component Dv, the acceleration component Da, the inclination component Ds, and the total weight M of the dump truck 2 at the time point tb. The addition processing unit 45 calculates the correction acceleration command value Sc by adding the acceleration command value Si calculated by the acceleration command value calculation unit 47 at the time point tb and the correction value Cv. The acceleration command value output unit 41 outputs the correction acceleration command value Sc to the driving device 24.

That is to say, in the embodiment, when the acceleration command value with a positive value is output after the acceleration command value becomes zero, the acceleration command value output unit 41 outputs the correction acceleration command value Sc obtained by shifting (raising the level of) the acceleration command value Si to the positive side by the correction value Cv, as illustrated by the solid line in FIG. 8. Thereby, when the traveling state changes from the acceleration state to the coasting state and then the traveling state changes to the acceleration state again while the dump truck 2 travels on a road surface where the road surface resistance is large, such as a road surface of an oil sand, the actual target speed Vs is prevented from being significantly lower than the target traveling speed Vr.

In FIG. 8, a line indicated by the dashed line indicates an example in which the acceleration command value Si output from the acceleration command value calculation unit 47 is output from the acceleration command value output unit 41 without being added to the correction value Cv. The acceleration change amount So is integrated by the integrator 43 in the acceleration command value calculation unit 47, so that when the acceleration command value with a positive value is output after the acceleration command value once becomes zero, as illustrated by the dashed line, the acceleration command value Si gradually increases. Therefore, on a road surface where the road surface resistance is large, such as a road surface of an oil sand, the acceleration of the dump truck 2 is insufficient and there is a possibility that the actual target speed Vs is significantly lower than the target traveling speed Vr.

According to the embodiment, the correction value Cv is added to the acceleration command value Si that is integrated by the integrator 43, so that it is possible to rapidly output a large driving force at the time point tb to cause the dump truck 2 to travel at the target traveling speed Vr even when the dump truck 2 travels on a road surface where the road surface resistance is large, such as a road surface of an oil sand. Therefore, the actual target speed Vs is prevented from being significantly lower than the target traveling speed Vr.

Regarding a determination whether or not to add the correction value Cv to the acceleration command value Si at the time point tb, when the acceleration command value Si is zero at a time point prior to the time point tb by one cycle T, the correction value Cv is added to the acceleration command value Si at the time point tb.

<Management Method>

Figure 9:
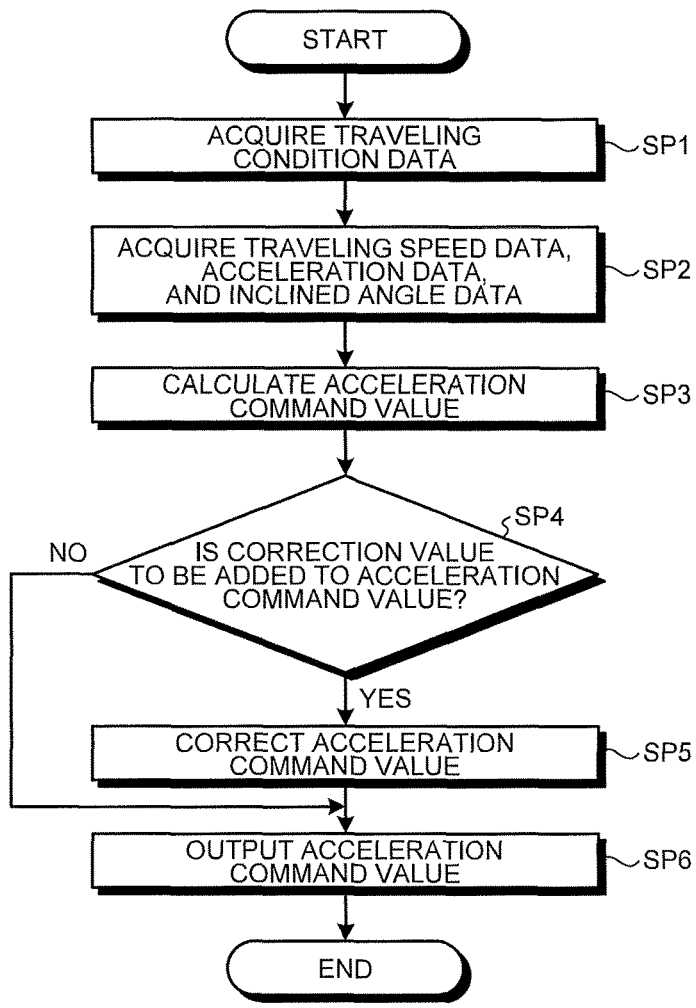
FIG. 9 is a flowchart illustrating an example of an operation of the control system of the dump truck according to the embodiment.

Next, a management method of the dump truck 2 according to the embodiment will be described. FIG. 9 is a flowchart illustrating an example of an operation of the management system 1 according to the embodiment.

The management device 10 generates the traveling condition data including the target traveling speed Vr and the target traveling route RP in the mine and transmits the traveling condition data to the dump truck 2 through the communication system 9. The dump truck 2 acquires the traveling condition data (step SP1).

While the dump truck 2 is traveling, the traveling speed detector 31, the acceleration detector 32, and the inclined angle detector 33, which are mounted in the dump truck 2, detect the traveling speed data, the acceleration data, and the inclined angle data of the dump truck 2. The control device 20 of the dump truck 2 acquires the traveling speed data, the acceleration data, and the inclined angle data (step SP2).

The acceleration command value calculation unit 47 calculates the acceleration command value Si based on the acquired traveling speed data, acceleration data, and inclined angle data (step SP3).

Specifically, the acceleration change amount calculation unit 42 calculates the acceleration change amount So based on the acquired traveling speed data, acceleration data, and inclined angle data. The calculated acceleration change amount So is integrated by the integrator 43 and the acceleration command value Si is output.

The addition processing unit 45 determines whether or not to add the correction value Cv to the acceleration command value Si output from the acceleration command value calculation unit 47. In other words, the addition processing unit 45 determines whether or not to raise the level of the acceleration command value Si (step SP4).

As in the example of the embodiment described above, when a configuration, where the correction value Cv is added only when the acceleration command value switches from zero to a positive value, is adopted, the addition processing unit 45 determines whether or not the acceleration command value Si is zero at a time point of one cycle before, and when the addition processing unit 45 determines that the acceleration command value Si is zero at a time point of one cycle before, the addition processing unit 45 determines to add the correction value Cv to the acceleration command value Si. When the addition processing unit 45 determines that the acceleration command value Si is a positive value at a time point of one cycle before, the addition processing unit 45 determines not to add the correction value Cv to the acceleration command value Si.

In the embodiment, when the dump truck 2 that is in a stopped state starts, even if it is determined that the acceleration command value Si is zero at a time point of one cycle before, the acceleration command value Si and the correction value Cv are not added together. When the acceleration command value Si at the time point tb is smaller than the acceleration command value at a time point of one cycle before, the acceleration command value Si and the correction value Cv are not added together. When the dump truck 2 is commanded from the management device 10 to stop at a certain stop point in the mine and the dump truck 2 is located at a position close to the stop point (for example, at a position within a radius of 10 m around the stop point), even if it is determined that the acceleration command value Si is zero at a time point of one cycle before, the acceleration command value Si and the correction value Cv are not added together.

When it is determined to add the correction value Cv to the acceleration command value Si in step SP4, that is, when it is determined that the acceleration command value Si calculated at the time point ta is zero (step SP4: Yes), the correction value calculation unit 44 calculates the first driving force component of the driving device 24 to cause the dump truck 2 to travel at the target traveling speed Vr and the second driving force component of the driving device 24 to offset a resistance component against traveling of the dump truck 2 (that is, calculates the driving force Freq). The correction value calculation unit 44 then calculates the correction value Cv for the acceleration command value Si based on the first driving force component and the second driving force component. The addition processing unit 45 calculates the correction acceleration command value Sc by adding the acceleration command value Si integrated by the integrator 43 and the correction value Cv calculated by the correction value calculation unit 44 (step SP5).

The acceleration command value output unit 41 outputs the correction acceleration command value Sc generated by adding the acceleration command value Si and the correction value Cv to the driving device 24 (step SP6).

When it is determined not to add the correction value Cv to the acceleration command value Si in step SP4, that is, when it is determined that the acceleration command value Si calculated at a time point of one cycle before is not zero (step SP4: No), the addition processing unit 45 does not add the acceleration command value Si integrated by the integrator 43 and the correction value Cv calculated by the correction value calculation unit 44.

The acceleration command value output unit 41 outputs the acceleration command value Si which is not corrected by the correction value Cv and which is integrated by the integrator 43 to the driving device 24 (step SP6).

<Actions and Effects>

As described above, according to the embodiment, the correction value Cv for the acceleration command value is calculated based on the driving force Freq to cause the dump truck 2 to travel at the target traveling speed Vr, the acceleration command value whose level is raised is calculated by adding the acceleration command value calculated by the acceleration command value calculation unit 47 and the correction value Cv calculated by the correction value calculation unit 44, and the acceleration command value is output to the driving device 24. Thereby, the traveling speed Vs of the dump truck 2 is prevented from excessively decreasing even when the dump truck 2 travels on a road surface where the road surface resistance is large, such as a road surface of an oil sand. The dump truck 2 can travel while reducing an error from the target traveling speed Vr and it is possible to prevent the dump truck 2 from being stacked on a road surface like the oil sand, so that degradation of productivity in the mine is suppressed.

In the embodiment, if it is determined that the acceleration command value Si calculated at a time point of one cycle before is zero, that is, if it is determined that the traveling state of the dump truck 2 is the coasting state, the addition processing unit 45 calculates the correction acceleration command value Sc by adding the acceleration command value Si calculated at the time point tb and the correction value Cv when the addition processing unit 45 changes the acceleration command value from zero to a positive value at the time point tb later than the time point of one cycle before, that is, when the addition processing unit 45 changes the traveling state from the coasting state to the acceleration state. Thereby, when the traveling state is changed from the coasting state to the acceleration state, the traveling speed of the dump truck 2 is prevented from excessively decreasing.

Figure 10:
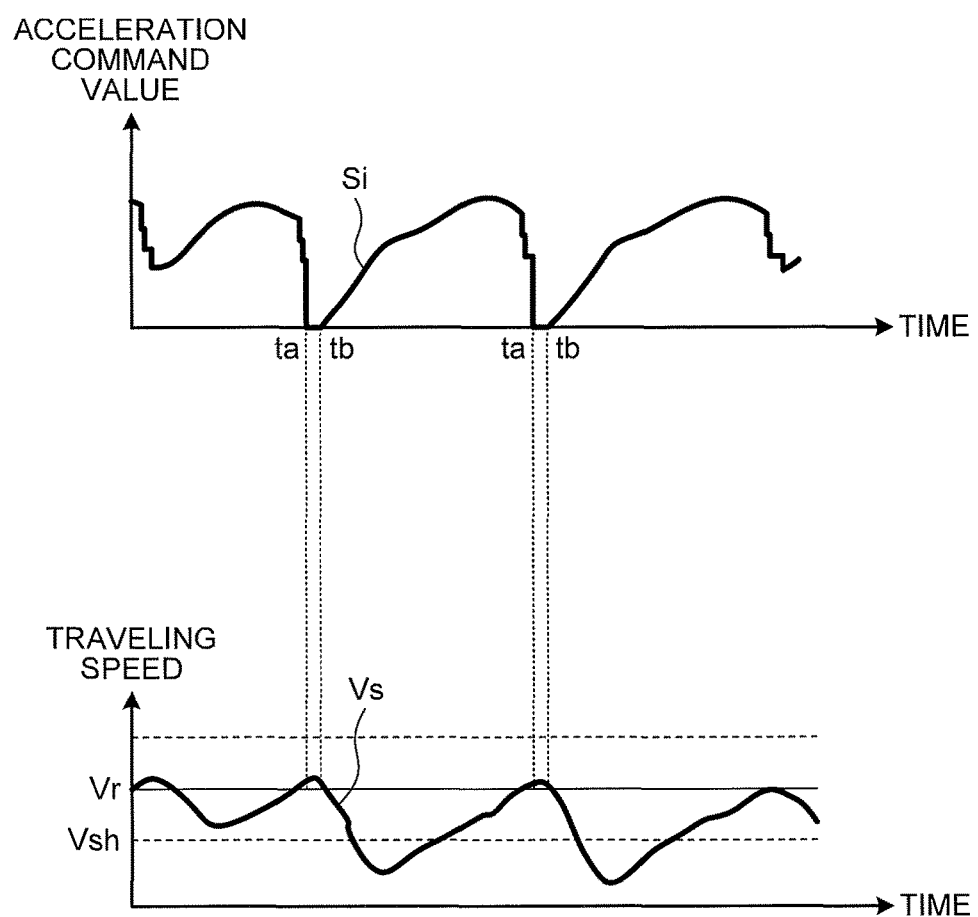
FIG. 10 is a diagram for explaining an operation of a dump truck according to a comparative example.
Figure 11:
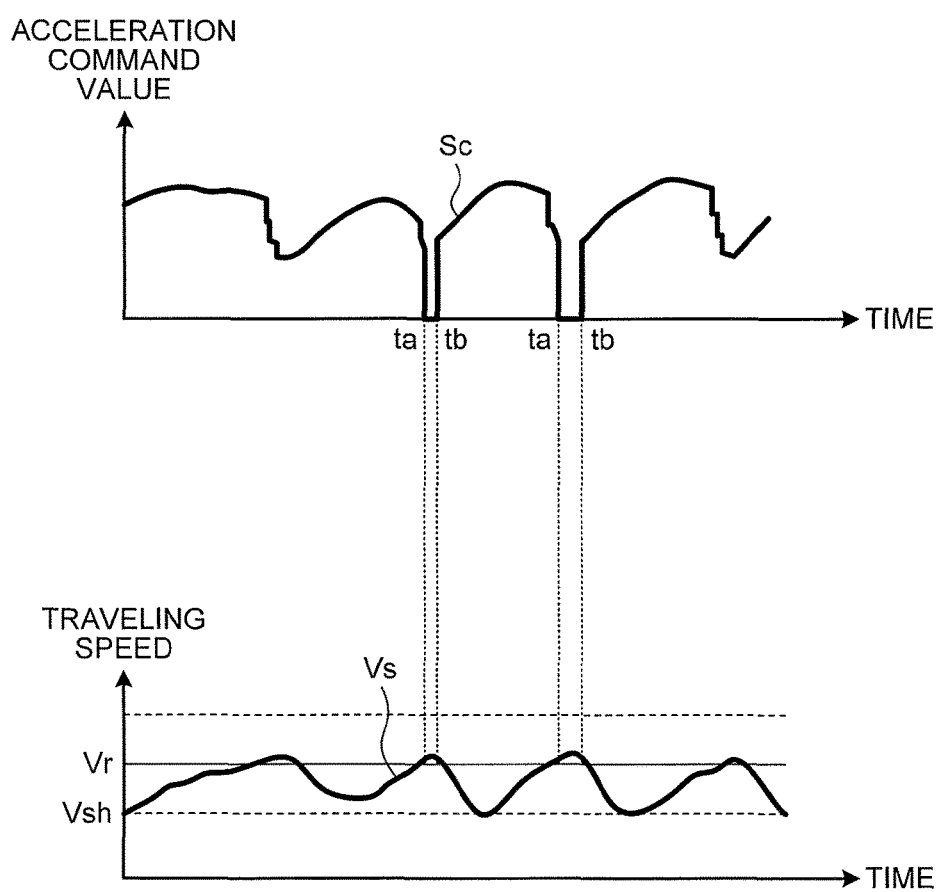
FIG. 11 is a diagram for explaining an operation of the dump truck according to the embodiment.

FIG. 10 illustrates a relationship between the acceleration command value Si to which the correction value Cv is not added and the traveling speed Vs of the dump truck 2. FIG. 11 illustrates a relationship between the acceleration command value Sc to which the correction value Cv is added and the traveling speed Vs of the dump truck 2. As illustrated in FIG. 10, when the correction value Cv is not added at the time point tb, the acceleration command value Si gradually increases after the time point tb. Therefore, when the dump truck 2 travels on a road surface where the road surface resistance is large, such as a road surface of an oil sand, the traveling speed Vs of the dump truck 2 becomes significantly lower than the target traveling speed Vr and an phenomenon occurs in which the traveling speed Vs is lower than an allowable range speed Vsh determined for the target traveling speed Vr. As illustrated in FIG. 11, the correction value Cv is added at the time point tb, so that the acceleration command value Sc rapidly increases after the time point tb. Therefore, even when the dump truck 2 travels on a road surface where the road surface resistance is large, such as a road surface of an oil sand, the traveling speed Vs of the dump truck 2 is prevented from becoming significantly lower than the target traveling speed Vr and the traveling speed Vs is prevented from becoming lower than the allowable range speed Vsh determined for the target traveling speed Vr.

In the embodiment, when the acceleration command value Si is zero at a time point of one cycle before, the acceleration command value Si and the correction value Cv are added together at the time point tb and the correction acceleration command value Sc is output. When the acceleration command value Si is a positive value at a time point of one cycle before, the acceleration command value Si and the correction value Cv are not added together and the acceleration command value Si is output. Thereby, the correction acceleration command value Sc is prevented from being output unnecessarily, and for example, the dump truck 2 can travel at the target traveling speed Vr in a state in which deterioration of fuel consumption is suppressed.

In the embodiment, the speed deviation component Dv is derived based on the detection result of the traveling speed detector 31, the acceleration component Da is derived based on the detection result of the acceleration detector 32, the inclination component Ds is derived based on the detection result of the inclined angle detector 33, and the total weight M of the dump truck 2 is derived based on the detection result of the load amount detector 34. The correction value Cv is calculated based on the first driving force component derived from at least one of the speed deviation component Dv and the total weight M and the second driving force component derived from at least one of the acceleration component Da, the inclination component Ds, and total weight M. Thereby, an appropriate correction value Cv for the acceleration command value Si when the traveling state is changed from the coasting state to the acceleration state is calculated.

In the embodiment described above, when the acceleration command value Si calculated at a time point of one cycle before is zero, the acceleration command value Si and the correction value Cv are added together at the time point tb. However, even when the acceleration command value Si calculated at a time point of one cycle before is not zero, the acceleration command value Si and the correction value Cv may be added together at the time point tb. Even when the acceleration command value Si calculated at a time point of one cycle before is a positive value, if the value of the acceleration command value Si is a sufficiently small value smaller than or equal to a predetermined threshold value and the traveling state of the dump truck 2 at the time point tb can be assumed to be the coasting state, the addition processing unit 45 may calculate the correction acceleration command value Sc by adding the acceleration command value Si calculated at the time point tb later than the time point of one cycle before and the correction value Cv. The calculated correction acceleration command value Sc is output from the acceleration command value output unit 41 to the driving device 21, so that the dump truck 2 can travel according to the target traveling speed Vr. When the acceleration command value Si calculated at a time point of one cycle before is greater than the threshold value, the acceleration command value Si and the correction value Cv are not added together, so that the correction acceleration command value Sc is prevented from being output unnecessarily.

In the embodiment described above, the dump truck 2 is assumed to be an unmanned dump truck. However, the dump truck 2 may be a manned dump truck that travels according to an operation of a driver. In the manned dump truck, an operation unit such as an accelerator pedal to operate the driving force of the driving device 24 is provided, and the operation unit is operated by a driver. In the case of the manned dump truck travelling on a road surface where the road surface resistance is large, such as a road surface of an oil sand, if the amount of operation of the operation unit performed by a driver to change the coasting state to the acceleration state is small (if a stepping-in amount of accelerator pedal is small), there is a possibility that the traveling speed Vs of the dump truck 2 decreases significantly and stack occurs. In this case, the control system 20 intervenes in the operation of the operation unit and outputs the correction acceleration command value Sc to the driving device 24. In other words, the control system 20 performs a so-called assist control that assists the operation of the driver. Thereby, the traveling speed Vs of the manned dump truck is prevented from significantly decreasing.

In the embodiment described above, the control system 20 is applied to the dump truck 2 that travels on the road surface of oil sand. The road surface of the mine where the dump truck 2 travels need not be a road surface of oil sand, and the control can be applied to even a road surface that is muddy due to, for example, rain, underground water, or flowing water. The control system 20 and the management system 1 according to the embodiment described above can be applied to the dump truck 2 that travels on a road surface of a mine where the road surface resistance is large.

REFERENCE SIGNS LIST

1 MANAGEMENT SYSTEM
2 DUMP TRUCK (MINING MACHINE)
3 ANOTHER MINING MACHINE

4 MINING MACHINE
5 POSITIONING SATELLITE
6 REPEATER
7 CONTROL FACILITY
9 COMMUNICATION SYSTEM
10 MANAGEMENT DEVICE
11 COMPUTER
12 PROCESSING DEVICE
13 STORAGE DEVICE
13B DATABASE
15 INPUT/OUTPUT UNIT
16 DISPLAY DEVICE
17 INPUT DEVICE
18 WIRELESS COMMUNICATION DEVICE
18A ANTENNA
20 CONTROL SYSTEM
21 TRAVELING DEVICE
22 VEHICLE MAIN BODY
23 VESSEL
24 DRIVING DEVICE
25 CONTROL DEVICE
26 VEHICLE WHEEL
27 AXLE
28 BRAKE DEVICE
29 STEERING GEAR
31 TRAVELING SPEED DETECTOR
32 ACCELERATION DETECTOR
33 INCLINED ANGLE DETECTOR
34 LOAD AMOUNT DETECTOR
35 POSITION DETECTOR
36 WIRELESS COMMUNICATION DEVICE
41 INPUT/OUTPUT UNIT (ACCELERATION COMMAND VALUE OUTPUT UNIT)
42 ACCELERATION CHANGE AMOUNT CALCULATION UNIT
43 INTEGRATOR
44 CORRECTION VALUE CALCULATION UNIT
45 ADDITION PROCESSING UNIT
46 STORAGE UNIT
47 ACCELERATION COMMAND VALUE CALCULATION UNIT
As ACCELERATION
Cr CRUSHING MACHINE
Cv CORRECTION VALUE
DPA EARTH DISCHARGING SITE
HL CONVEYING PATH
LPA LOADING SITE
M TOTAL WEIGHT
PA WORK AREA
RP TARGET TRAVELING ROUTE
So ACCELERATION CHANGE AMOUNT
Si ACCELERATION COMMAND VALUE
Sc CORRECTION ACCELERATION COMMAND VALUE
ta TIME POINT
tb TIME POINT (SECOND TIME POINT)
Vr TARGET TRAVELING SPEED
Vs TRAVELING SPEED
θ INCLINED ANGLE

The invention claimed is:

1. A mining machine control system that controls a driving device configured to drive a traveling device of a mining machine, the mining machine control system comprising:
an acceleration command value calculation unit that calculates an acceleration command value for accelerating the mining machine, wherein the acceleration command value calculation unit includes an acceleration change amount calculation unit that calculates an acceleration change amount and an integrator that integrates the calculated acceleration change amount to output the integrated acceleration change amount as the acceleration command value;
a correction value calculation unit that calculates a correction value for the acceleration command value, based on a first driving force component of the driving device to cause the mining machine to travel at a target traveling speed and on a second driving force component of the driving device to offset a resistance component against traveling of the mining machine;
an addition processing unit that calculates a correction acceleration command value by adding the acceleration command value and the correction value; and
an acceleration command value output unit that outputs the correction acceleration command value to the driving device, wherein
the acceleration command value calculation unit calculates the acceleration command value at a predetermined time period,
when the acceleration command value calculated at a first time point prior to a second time point by one cycle is smaller than or equal to a threshold value, the addition processing unit calculates the correction acceleration command value by adding the correction value and the acceleration command value which is calculated at the second time point later than the first time point and is output by the integrator,
a state in which the acceleration command value calculated at a first time point is smaller than or equal to a threshold value refers to a state in which the acceleration command value is zero,
when the acceleration command value calculated at the first time point is smaller than or equal to the threshold value, the acceleration command value from the integrator and the correction value are added together and the correction acceleration command value is output from the acceleration command value output unit, and
when the acceleration command value calculated at the first time point is greater than the threshold value, the acceleration command value from the integrator is output from the acceleration command value output unit without being added to the correction value.

2. The mining machine control system according to claim 1, further comprising:
a traveling speed detector that detects a traveling speed of the mining machine; and
an acceleration detector that detects an acceleration of the mining machine,
wherein the correction value calculation unit calculates the first driving force component based on a detection result of the traveling speed detector and calculates the second driving force component based on a detection result of the acceleration detector.

3. The mining machine control system according to claim 1, further comprising:
an inclined angle detector that detects an inclined angle of the mining machine with respect to a horizontal plane,
wherein the correction value calculation unit calculates the second driving force component based on a detection result of the inclined angle detector.

4. The mining machine control system according to claim 1, wherein
the mining machine includes a transporting machine including a vessel, the mining machine control system further includes a load amount detector that detects a load amount of a load loaded on the vessel, and the correction value calculation unit calculates the second driving force component based on a detection result of the load amount detector.

5. A mining machine comprising the mining machine control system according to claim 1.

6. A mining machine management system comprising a management device that outputs traveling condition data including the target traveling speed and a target traveling route to the mining machine according to claim 5.

7. A mining machine management method comprising:

transmitting traveling condition data including a target traveling speed and a target traveling route in a mine to a mining machine including a traveling device driven by a driving force of a driving device;

calculating an acceleration command value for accelerating the mining machine by calculating an acceleration change amount and integrating the calculated acceleration change amount to output the integrated acceleration change amount as the acceleration command value;

calculating a first driving force component of the driving device to cause the mining machine to travel at the target traveling speed;

calculating a second driving force component of the driving device to offset a resistance component against traveling of the mining machine;

calculating a correction value for the acceleration command value based on the first driving force component and the second driving force component;

calculating a correction acceleration command value by adding the acceleration command value and the correction value; and outputting the correction acceleration command value to the driving device, wherein the acceleration command value is calculated at a predetermined time period, when the acceleration command value calculated at a first time point prior to a second time point by one cycle is smaller than or equal to a threshold value, the correction acceleration command value is calculated by adding the correction value and the acceleration command value which is calculated at the second time point later than the first time point and the correction acceleration command value is output, a state in which the acceleration command value calculated at a first time point is smaller than or equal to a threshold value refers to a state in which the acceleration command value is zero, when the acceleration command value calculated at the first time point is smaller than or equal to the threshold value, the acceleration command value from the integrator and the correction value are added together and the correction acceleration command value is output from the acceleration command value output unit, and when the acceleration command value calculated at the first time point is greater than the threshold value, the acceleration command value from the integrator is output from the acceleration command value output unit without being added to the correction value.

* * * * *